(12) United States Patent
Rymer et al.

(10) Patent No.: US 7,747,497 B1
(45) Date of Patent: *Jun. 29, 2010

(54) SYSTEM AND METHOD FOR REFERRAL FEE PROCESSING IN ACCOUNTS MANAGED BY FINANCIAL ADVISORS

(75) Inventors: Joshua Rymer, San Francisco, CA (US); Gerald Graves, Corte Madera, CA (US); Deborah D. McWhinney, Tiburon, CA (US); Andrew Salesky, San Rafael, CA (US); Charles D. Welling, San Rafael, CA (US); Steven Hirsch, Moraga, CA (US)

(73) Assignee: Charles Schwab & Co., Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/339,569

(22) Filed: Dec. 19, 2008

Related U.S. Application Data

(63) Continuation of application No. 10/121,195, filed on Apr. 12, 2002, now Pat. No. 7,483,847.

(51) Int. Cl.
G06Q 40/00 (2006.01)
(52) U.S. Cl. ...................................................... 705/35
(58) Field of Classification Search ..................... 705/35
See application file for complete search history.

(56) References Cited

U.S. PATENT DOCUMENTS

| 4,648,037 A | 3/1987 | Valentino |
| 4,953,085 A | 8/1990 | Atkins |
| 5,623,662 A | 4/1997 | McIntosh |
| 5,657,222 A | 8/1997 | Randolph |
| 5,775,734 A | 7/1998 | George, Jr. |
| 6,076,072 A | 6/2000 | Libman |
| 6,192,347 B1 | 2/2001 | Graff |

(Continued)

FOREIGN PATENT DOCUMENTS

WO    WO 01/59653 A1    8/2001

OTHER PUBLICATIONS

"Microsoft Offers Link to Financial Planning Services; Internet: Advisor Finder relies on a database of 3,000 planners. But one critic scoffs: Its's one giant Yellow Pages ad. [Home Edition]." Liz Pullium. Los Angeles Times. Los Angeles, Calif.: Jul. 24, 1999. p. 1.

(Continued)

*Primary Examiner*—Jagdish N Patel
*Assistant Examiner*—Sara Chandler
(74) *Attorney, Agent, or Firm*—Townsend and Townsend and Crew LLP

(57) ABSTRACT

A method and apparatus which provides for a referral program where a financial institution, such as a broker dealer, can refer customers to an independent financial advisor, under an on-going referral fee sharing agreement. The on-going referral fee sharing agreement provides that the financial advisor will pay the referring financial institution an on-going referral fee based on the asset management fee that the advisor charges. These referral fees are processed automatically and the transfers are done electronically, allowing the referral program to be implemented efficiently and effectively.

11 Claims, 6 Drawing Sheets

U.S. PATENT DOCUMENTS

| | | | |
|---|---|---|---|
| 6,202,054 | B1 | 3/2001 | Lawlor et al. |
| 6,223,983 | B1 | 5/2001 | Kjonaas et al. |
| 6,226,623 | B1 | 5/2001 | Schein et al. |
| 6,243,688 | B1 | 6/2001 | Kalina |
| 7,483,847 | B1 | 1/2009 | Rymer et al. |
| 2002/0023030 | A1* | 2/2002 | Prohaska et al. ............... 705/35 |
| 2003/0088489 | A1* | 5/2003 | Peters et al. .................. 705/36 |

OTHER PUBLICATIONS

"Schwab's New Direction: The San Francisco giant claims that well-intentioned software exclusivity is the centerpiece of its newest initiative, but suspicious planners fear that these good intentions may be paving the way to you-know-where." Richard J. Koreto. Financial Planning. New York: Apr. 1, 2002. p. 1.

"Shop Before Taking Free Financial Advice; [Final Edition]." Laura Castaneda, Chronicle Staff Writer. San Francisco Chronicle. San Francisco, Calif.: Mar. 30, 1998. p. E. 1.

"Schwab Capitalizes on Referrals to Fee-Based Advisors." Yvette D. Kantrow. American Banker. New York, NY: Jul. 15, 1997. vol. 162, Iss. 134; p. 11.

* cited by examiner

SYSTEM AND METHOD FOR REFERRAL FEE PROCESSING IN ACCOUNTS MANAGED BY FINANCIAL ADVISORS

CROSS-REFERENCE TO RELATED APPLICATIONS

This application is a continuation of and claims priority from U.S. patent application Ser. No. 10/121,195, filed Apr. 12, 2002, entitled System and Method for Referral Fee Processing in Accounts Managed by Financial Advisors, which is herein incorporated by reference in its entirety.

TECHNICAL FIELD

The present invention relates to a system and method for a referral program for financial accounts.

BACKGROUND

Financial institutions can provide customers/investors with a wide range of services, but it is frequently the case that one financial institution does not adequately meet all the requirements of a customer/investor. One type of financial institution is a broker dealer. As is known in the art, a broker dealer financial institution holds customer financial accounts and operates to execute transactions such as the buying and selling of securities on behalf of customers. FIG. 1 shows a prior system 100 for a broker dealer. A broker dealer can establish investor accounts for its customers. These customers/investors, sometimes referred to as retail investors, who have relationships directly with the broker dealer and have not enlisted the services of financial advisor to manage their investor account. These customers are shown in FIG. 1 as investors 1, 2, ..., N. Data pertaining to these retail investor financial accounts 104 is stored in a data storage system 102. FIG. 5 shows an overview of relationships relating to a broker dealer 502. Each of the investors 504 enters into an investor broker dealer agreement 506 with the broker dealer 502 which specifies aspects of the relationship between the investor and the broker dealer. As shown in FIG. 1, investors can communicate with the broker dealer via an internet 120 connection, or other suitable communication network, to a communication port 110 of the broker dealer system 100. The investor can also directly contact representatives of the broker dealer, either in person or via telephone. The investors have financial accounts 508 holding a variety of financial assets which are custodied with the broker dealer. Assets held in the accounts can include stocks, bonds, mutual funds, bond funds and money market funds. In response to investor instructions the broker dealer executes transactions 510, such as the buying selling of assets with others in the financial markets 512.

In some cases the broker dealers employ stockbrokers that provide specific financial advice to investors, such as recommending that an investor customer buy or sell a specific security. In other cases the broker dealers operate to provide customers with general information regarding investments, such as recommending general asset allocation strategies, or other investment strategies. In some cases broker dealers do not provide a high degree of direct interaction between an individual stockbrokers and individual clients, and do not provide specific recommendations, such as buy Stock A and sell stock B. The investor/broker dealer agreement 506 specifies fees that are charged to the investor for different services provided to the investor 504 by the broker dealer 502.

In some cases, an investor will take a different approach and work directly with an independent financial advisor 112. The advisor 112 takes on responsibility for managing the assets held in its client's account 514. In these situations the client of the advisor 516 relies on the advisor's services to implement investment strategies and wealth management approaches that fit the client's needs. In these cases, the broker dealer 502 will typically provide very little direct advice to the client of the advisor 516 with respect to the client of the advisor account 514 which is managed by the advisor 112. In these situations, the broker dealer 502 will act primarily as a custodian to hold the client of the advisor financial accounts 514 and the assets therein, and to execute the transactions as directed by the financial advisor 112. The clients of the advisor 516 (in FIG. 5) are shown in FIG. 1 as client A, B, ... Z of advisor. Where a client employs the services of an advisor 112, the advisor and the client of the advisor 516 enter into an Advisor/client agreement 518, which specifies aspects of the advisor-client relationship. Typically an Advisor/Client agreement 518 provides for an asset management fee, where the management fee is percentage of the total assets managed by the advisor. Usually this amount is about 1% of the total assets, and can vary up or down depending on the total value of the assets managed by the advisor. In some cases, the advisor may charge additional fees for additional services such as financial planning, estate planning, and tax preparation. These additional fees can be considered part of the asset management fee or can be treated separately.

Advisors 112 who have client of advisor accounts 514 custodied with the broker dealer 100 enter into an advisor/broker dealer agreement 520 which specifies aspects of the relationship between the advisor 112 and the broker dealer 502. This agreement specifies fees which the broker dealer will charge the advisor for services provided by the broker dealer. The client of the advisor will also enter into an agreement 522 with the broker dealer regarding their relationship with the broker dealer 502. The broker dealer system 100 stores data for all of the clients of the advisor whose accounts 514 are custodied with the broker dealer. The client of the advisor account data 106 stored in the database system 102 of the broker dealer system 100 contains, among other data, information identifying the specific advisor associated with each client of the advisor account 514, and information identifying the assets held in each client of the advisor account.

During the normal course of business, broker dealers frequently identify retail investors who are interested in forming a relationship with an independent financial advisor 112. Frequently, such investors will seek guidance from the broker dealer in connection with their interest in retaining the services of a financial advisor 112. In such situations, the broker dealer 502 may want to refer such an investor to an advisor 112 that they have worked with in the past, and found to be reputable and effective independent financial advisors.

Charles Schwab & Co., Inc. (Schwab), which is a broker dealer, and the assignee of the invention herein has previously developed and implemented programs for referring qualified investors seeking the services of an advisor. One recent program implemented by Schwab is the AdvisorSource® program, which has been widely publicized and utilized by both customers and advisors. The AdvisorSource® program requires that the independent financial advisor pay a fee to the broker dealer for referrals of investors interested in retaining the services of a financial advisor. The referral fee paid under the AdvisorSource® program is based on the number of broker dealer branch offices which will refer customers to the financial advisor.

For example, a financial advisor would pay a set referral fee to receive referrals from a particular branch office of the broker dealer. As a result of the referral fees, referrals would be made from the particular branch office for a specified period of time. Whether or not referred investors engage the services of the financial advisor the referral fee would remain in effect, and it is not dependent on the number of investors, or the amount of the investor assets, which the financial advisor ends up managing as a result of the referrals. Under the AdvisorSource® program, the referral fee is a one-time fee paid by the financial advisor to the broker dealer, for a set period of time. This fee is one-time in that the advisor pays for referrals for a specified period of time, and the advisor has the option of paying an additional set fee after the prescribed period of time to receive additional referrals for an additional specified period of time. If the advisor opts to not pay for additional referrals, then the advisor will pay no additional money to the broker dealer under the referral program, and will not receive further referrals. Thus, for clients which the advisor has previously secured as a result of past referrals, there will be no additional referral fees due to the broker dealer.

In an earlier referral program implemented by Schwab the financial advisor would pay fees to the broker dealer based on the value of investor assets which were brought under the financial advisor's management as a result of a referral. This previous referral program provided that the amount the referral fee would decrease each year for a referred account, and after the third year of management by the financial advisor no additional referral fees would be due to the broker dealer. Specifically, this prior referral program provided that the advisor would make payments pay to the referring broker dealer as follows: thirty percent (30%) of the first year of advisory fees owed by the client to the advisor; twenty-five percent (25%) of the second year of advisory fees owed by the client to advisor; twenty percent (20%) of the third year of advisory fees owed by the client to advisor. According to this previous referral program the advisor was required to pay the broker at the time the client was required to pay the advisor. The process for implementing the payment of the referral fee was manually intensive. At the end of the quarter the broker dealer would prepare a form for the advisor identifying all of the referred accounts. This form was sent to the advisor, and the advisor would fill out the form and send it back to the referring broker dealer indicating the asset management fee for each referred account. The broker dealer would then generate an invoice for each advisor based on the above formula, and send the invoice to the advisor.

When an investor is referred to an advisor, and the investor and advisor enter into an advisor/client agreement, the investor account will be treated by the processor system 108 of the broker dealer system 100 as a client of the advisor account from that point forward. In the context of FIG. 1, this means that the customer account will now be moved to a client of the advisor account area 106 of the data storage system 102.

In some cases, the AdvisorSource® referral arrangement has been perceived as not aligning the interests of broker dealer with the interest of the financial advisor as directly as possible. For example, the broker dealer, derives revenue for making referrals regardless of whether or not the financial advisor is able to form a relationship with referred investors. Further, even under Schwab's referral program prior to AdvisorSource®, the broker dealer would receive large front-end loaded referral payments based on the advisor's asset management fees, but after three years, no further fees would be due to the broker dealer. Thus, the broker dealer would be in a position of having received a relatively large percentage of the early asset management fees generated by the financial advisor, even in the situation where the financial advisor was not successful in retaining the clients asset management business for the long-term. The prior referral programs introduced other limitations and concerns which are addressed by invention disclosed herein.

SUMMARY

The invention herein provides an apparatus for implementing a referral program by which a referring party can, under an on-going referral fee sharing agreement, refer an investor to a financial advisor who provides asset management services. The apparatus includes a processor system for processing data, and a database system for storing financial account data. The financial account data includes a referred financial account, which is managed by the financial advisor and which is subject to the on-going referral fee sharing agreement. Further, the processor operates to periodically analyze the financial account data in the database system and identify the referred financial account, and to automatically, on an ongoing basis, provide periodic electronic transfers of a referral fee to the referring party.

The invention herein provides a method for referring investors from a financial institution to a financial advisor that provides asset management services, where the financial institution and the financial advisor have entered an on-going referral fee sharing agreement. The method includes referring an investor to the financial advisor. Where the referred investor retains the service of the financial advisor to manage an investor financial account, data is entered into a database system, indicating that the investor has retained the services of the financial advisor and that the customer financial account is a referred account. The processor systems then provides on-going periodic automated electronic transfers of referral fees to the financial institution.

DETAILED DESCRIPTION

As discussed above, in the past, some broker dealers have referred investors to financial advisors. Under those prior referral programs, in return for referring investors to financial advisors, the financial advisors paid a fee to the broker dealer. Under one prior program, this would have been a flat fee for referrals over a period of time from specified branch office of the broker dealer. In other programs, a manual process was employed to send invoices to financial advisors for referral fees, where the amount of the referral fee was front end loaded and terminated within three years of the referral.

The system and method of the invention herein offers a number of advantages over previous referral programs, in that its unique referral fee structure aligns both the short-term and long-term interest of the broker dealer, the advisor and the investor. Further, the system and method of the invention herein provides for efficient and automated processing of referral fees associated with referring investors to an advisor.

Figure 6:
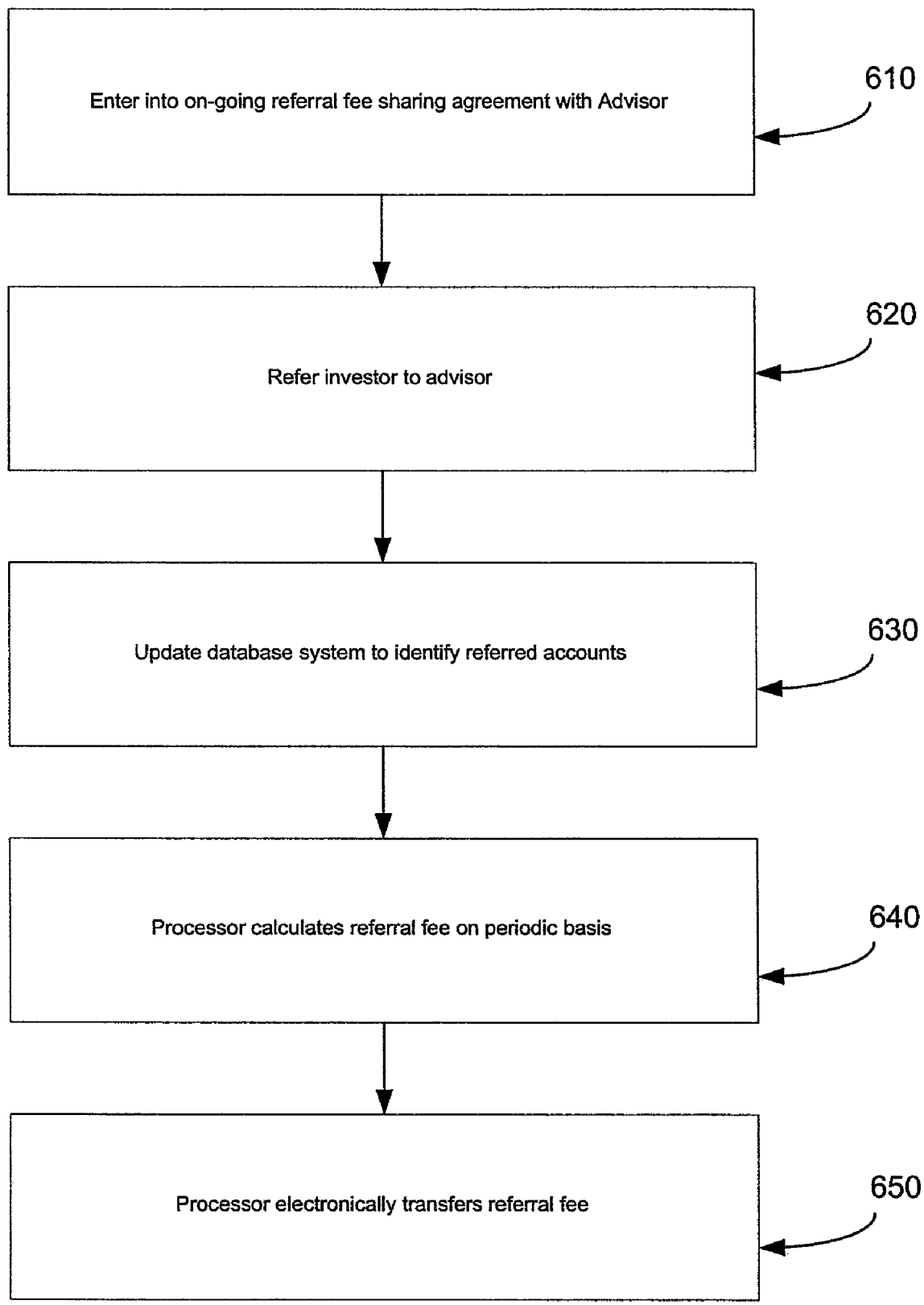
FIG. 6 is a flow chart illustrating a method of the present invention.

FIG. 6 shows an embodiment of a method of the present invention. At step 610, the broker dealer enters an on-going referral fee sharing contract with a qualified advisor. As will be discussed in more detail below, this on-going referral fee contract provides that a referral fee will be charged to the financial advisor for so long as the referred investor financial account is managed by the advisor. After the on-going referral fee sharing contract is executed, the broker dealer refers investors to the advisor 620. Where a referred investor engages the services of the financial advisor, the broker dealer updates 630 its database system to identify the investor's financial account as a referred client of advisor account. On a periodic basis, the processor system 212 of the broker dealer system 200, shown in FIG. 2, analyzes the client of an advisor financial account data to determine a referral fee 640. Once the referral fee has been determined, the processor system electronically transfers 650 a referral fee to the broker dealer. This transferring of a referral fee can be achieved by determining the amount of an asset management fee due to an advisor, and then transferring this asset management fee to the advisor, after deducting the referral fee due to the referring broker dealer. As will be discussed in detail below this processing and transferring of the referral fee is done by the processor system 212 in an automated manner. Further, this periodic transferring of a referral fee can be done in response to receiving notice from the financial advisor that an asset management fee is due to the advisor.

Figure 1:
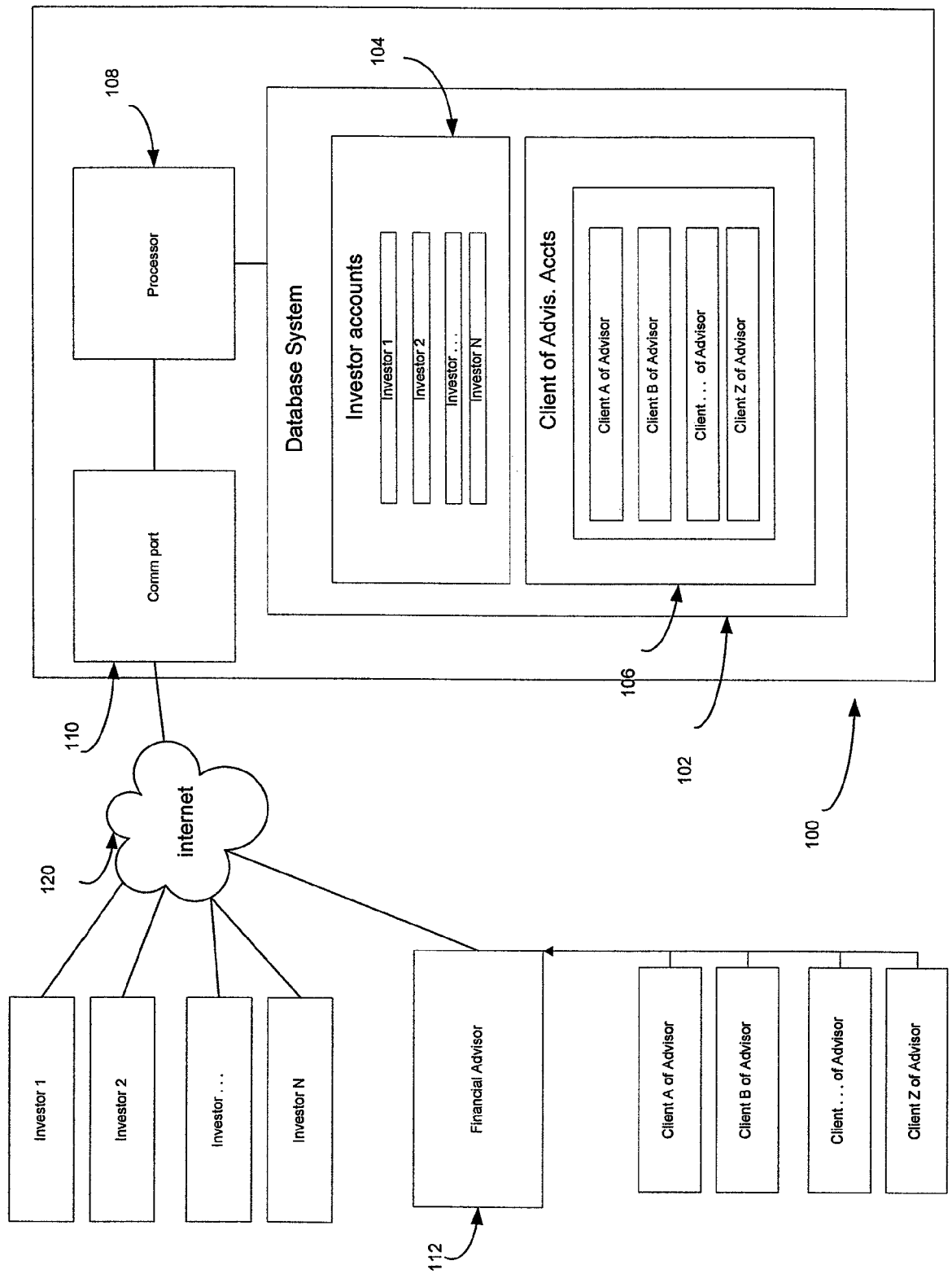
FIG. 1 is a diagram of a broker dealer system of the prior art.
Figure 2:
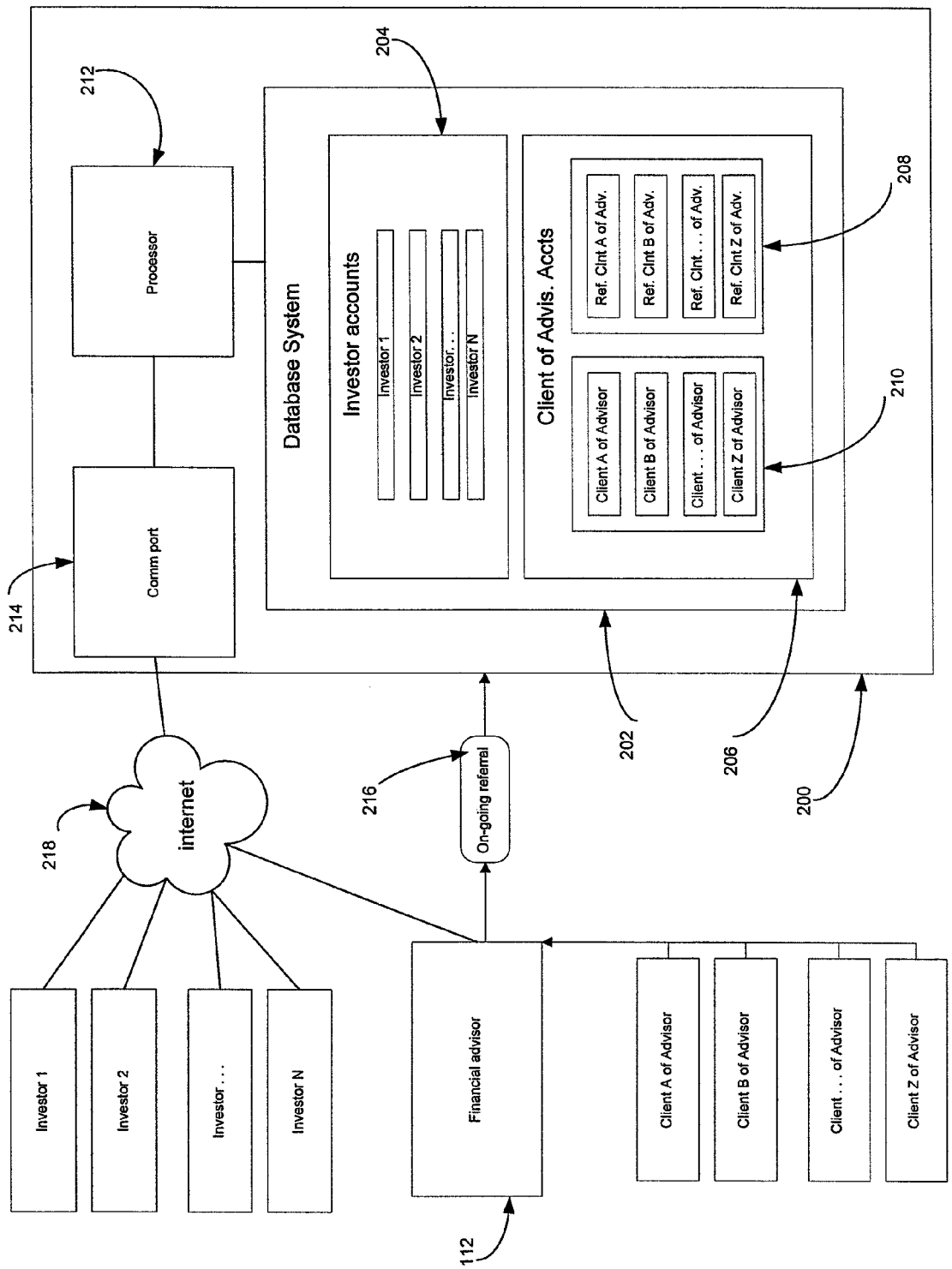
FIG. 2 is a diagram of a broker dealer system of the present invention.

FIG. 2 shows an embodiment of a broker dealer system 200 of the present invention. The broker dealer system includes a processor system 212 which analyzes and manages data in a database system 202. As will be appreciated by those skilled in the art a suitable processor system could be configured using mainframe computers from IBM, or server computer systems from Sun Microsystems, or other similar computer system products from a number of other vendors. As was the case with the prior system, each retail investor can access the broker dealer system via the internet 218, or other suitable communication network, through communication ports 214 of the broker dealer system. Additionally, the advisor 112 and the clients of the advisor can access the broker dealer system through communication ports 214. Depending on the specific implementation the clients of the advisor may directly access the broker dealer system or go through an advisor system to access client of advisor account data on the broker dealer system. Typically, the investors, clients of the advisor, and the advisor have computers which include a range of components including, a CPU, hard drive, software, including a web browser. Thus, they can communicate with the broker dealer system using conventional communication networks such as the internet 218, or other suitable communications network. It should also be noted that Advisors, clients of the advisors, and retail investors can also directly contact the employees of the broker dealer to give instructions regarding the financial accounts held by the broker dealer.

The broker dealer system can utilize a wide range of database products, including a conventional DB2 product commercially available from IBM Corporation of White Plains, N.Y., or other database products such as database system products by Oracle. The database system 202 holds detailed financial information. The database system 202 maintains retail investor account data 204 and client of advisor account data 206. The client of the advisor account data 206 includes data 208 which indicates which client of the advisor accounts were referred to the advisor by the broker dealer, and are subject to an on-going referral fee sharing agreement 216 (i.e., a referred financial account), and which accounts are client of advisor accounts that are not subject to an on-going referral fee sharing agreement 210.

Figure 3:
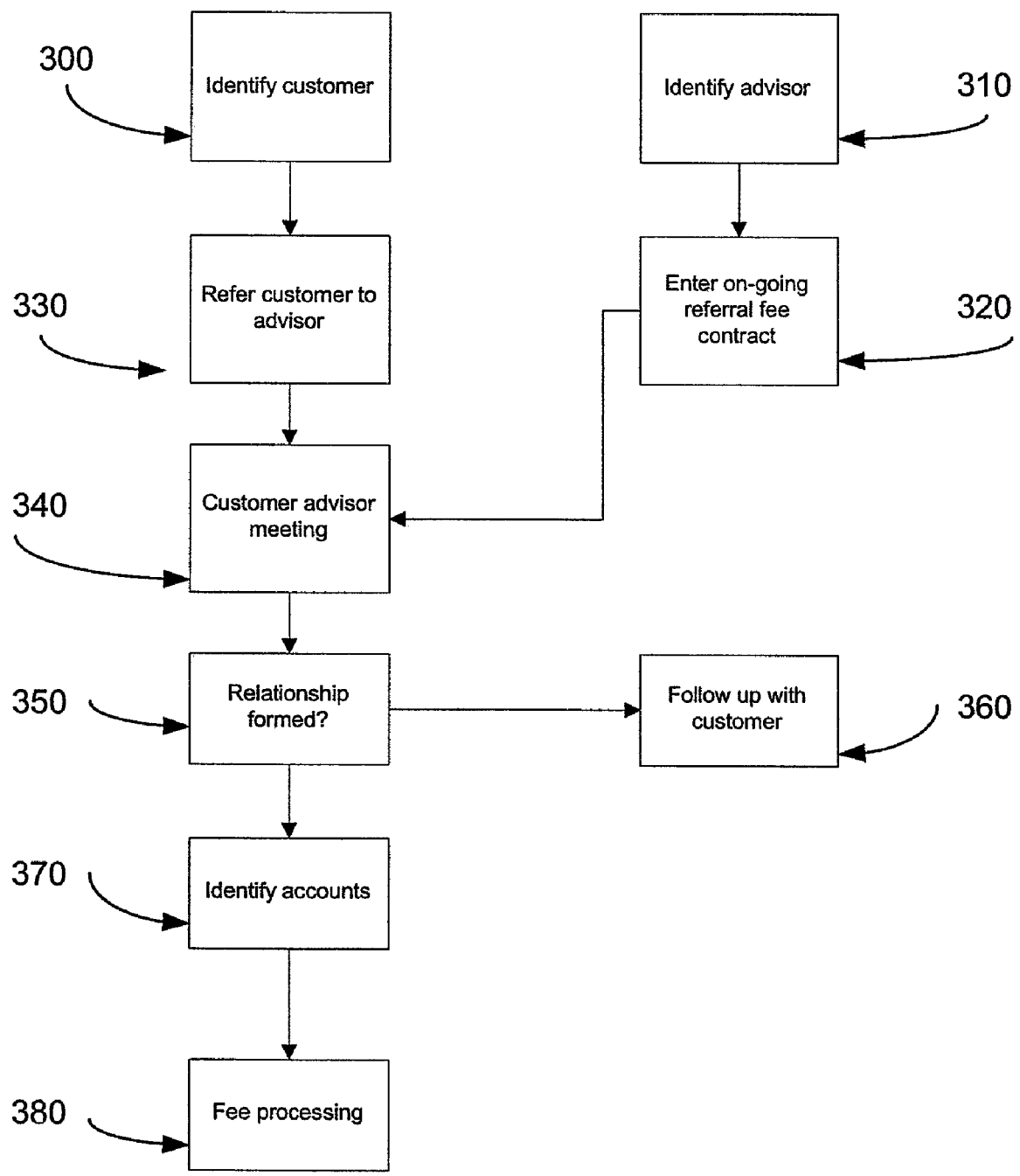
FIG. 3 is a flow chart illustrating a method of the present invention.

FIG. 3 is a flow chart describing an embodiment of a method of the present of invention. In this method the broker dealer identifies investors that are interested in retaining the services of an independent financial advisor at 300. In one embodiment investors who are suitable candidates for referral to a financial advisor should have investable assets in excess of $250,000.00. For investors with less money to invest, it is likely that a relationship with an independent financial advisor will not be suitable, because the fee structure for most financial advisors is such that it is uneconomical for advisors to service investors with less than $250,000.00 in investable assets.

Another part of the method herein is identifying an independent financial advisor 310, who is likely to be a suitable candidate for a referral program. Objective criteria has been identified to aid the process of selecting advisors for the referral program, where the goal is to select advisors who are most likely to provide effective service to investors. The financial advisor's business should be of sufficient size such that it suggests a sustainable business. Generally, suitable advisors will have at least $50,000,000.00 under management. Other criteria includes whether there are two or more principals, or partners, sharing ownership of the firm; whether the firm been a registered investment advisor for at least five years; whether there is at least one professional designation, such as a certified financial planner (CFP), or certified public accountant (CPA) per firm; and whether the advisor has error and omission insurance.

According to an embodiment of the invention, all advisors 112 who want referrals from the broker dealer 502 must enter into an on-going referral fee sharing agreement 216 with the broker dealer. The on-going referral fee sharing agreement 216 sets forth aspects of the relationship between the broker dealer and the financial advisor. If the advisor agrees to the terms of the on-going referral fee sharing agreement 320, then qualified investors will be referred to the investment advisor 330. Following the referral, the investor will meet with the advisor 340. In some circumstances it is beneficial to have a representative from the broker dealer present at the meeting between the advisor and the investor to facilitate the meeting.

The on-going referral fee sharing agreement 216 provides that if no relationship is formed between the investor and the financial advisor as a result of the broker dealer's referral of an investor to the advisor, then no fees will be due to the broker dealer. The broker dealer will receive information from the investor or advisor indicating if the customer has entered into an advisor customer agreement 350. Where a referral fails to result in the referred investor entering into an advisor investor agreement, then the broker dealer can follow up with the referred investor to see if another referral to a different advisor is appropriate 360. However, if a relationship is formed, then the accounts which are being managed by the advisor as a result of the referral are identified 370 as referred financial accounts in the broker dealer's processing system. On a periodic basis, which will typically be quarterly, or in response to receiving a notice from an advisor indicating that an asset management fee is due, the processing system will review the client of the advisor account and determine the amount for a referral fee to be transferred to the broker dealer 380.

FIG. 2 shows referred client of the advisor accounts 208 in the data storage system 202. Typically, the process of identifying an account as a referred financial account includes inputting data to the database system 202 which indicates that the financial account is a referred account and should be processed in accordance with the on-going referral fee sharing agreement.

Where the investor agrees to engage the services of an advisor, the customer 516 and the advisor 112 enter into an advisor client agreement 518 as discussed above. The advisor investor agreement 518 will typically provide that the investor will be charged an asset management fee (typically this is in the range of 1% of assets under management). The on-going referral fee sharing agreement 216 between the advisor and broker dealer, which is a separate agreement between the advisor and the broker dealer, provides, among other things, that where a referral results in an investor engaging the advisor and entering into an advisor investor agreement 518, the broker dealer will receive an on-going referral fee. This on-going referral fee is a percentage of the asset management fee which the advisor charges the customer.

The on-going referral fee sharing agreement can additionally set forth a number of additional obligations, such as that the advisor use their best efforts to ensure that the investor's referred financial account continue to be custodied at broker dealer. The contract can also requires that client of the advisor information be treated with a high degree of confidentiality. The on-going referral fee sharing agreement can further require that employees of the advisor who work with the referred investor agree to not solicit referred investors in the event that the advisor employee leaves the advisor firm. The agreement can also provide that the advisor must perform client relationship management best practices such as using written suitability questionnaires, producing quarterly performance reports and meeting with the investor on an annual basis. In one embodiment the agreement can also provide that the financial advisor can use certain marketing material to promote the fact that financial advisor is part of a network of financial advisors who receive referrals of investors from the broker dealer.

Ideally, the referral process will be such that a broker dealer can refer a qualified investor to a single financial advisor, and this referral will result in a successful match between the customer and the advisor. In some cases, however, a customer may be referred to a second financial advisor so as to increase the investor's options in selecting a financial advisor.

In one embodiment, the on-going referral fee sharing agreement provides that the broker dealer will receive 15% of the advisor's management fee for the referred account. As discussed above the asset management fee for a financial advisor is often based on the net value of the assets which the financial advisor is managing and is in the range of 1% per year. Thus, for an investor with a million dollars, under management they would pay a 1% management fee to their financial advisor which would be $10,000.00. According to the original referral fee sharing agreement the broker dealer would charge a referral fee of 15% of the 1% (i.e. 15 basis points), which would be $1,500.00 where the advisor's fee was $10,000. According to this embodiment the referral fee is on-going for as long as the client continues to engage the services of the advisor.

By structuring the referral fee so that it is based on a successful referral, which result in the investor engaging the services of the financial advisor, a number of advantages are obtained. For example, it provides the broker dealer with a direct incentive to make sure that the referrals are successful, and it provides the broker dealer with a long term financial interest in the advisor's relationship with the referred investor.

The fact that the on-going referral fee sharing agreement provides that a referral fee is paid to the referring party (i.e. the broker dealer) on a periodic basis for as long as the advisor manages the referred investor's financial account allows the amount of the referral fee to be paid initially to be a relatively small percentage of the total fee generated by the advisor. This arrangement is in strong contrast with the prior referral programs discussed above. As previously discussed, one such prior program provided that the advisor would initially pay a much larger percentage of the advisor's fees to the broker dealer, but these payments would not extend beyond the first three years of the advisor providing service to the referred customer. However, if the investor were to leave the advisor shortly after the conclusion of the first three years, the advisor would not be able to recover any of the referral fees paid to the referring party (the broker dealer). In this prior program, the broker dealer could be viewed as having incentive to make the initial referrals, but not the same financial incentive to support the advisors long-term relationship with the referred investor. Specifically, the present invention reduces the risk that the broker dealer's interest in the client-advisor relationship could diminish over time, as the broker dealer's referral fees would go to zero in three years. Further, under this prior program the advisor could be viewed as taking a unfair risk, in that the advisor had to give up a large percentage of the fees associated with the account during the first three years of management, but there was no recourse for the advisor if the referred investor left at the end of the third year. Also as discussed above this prior referral program was a largely manual process, and did not provide for an efficient and automated referral fee payment system and method.

Under the more recent AdvisorSource® referral program the advisor would pay a single up front referral fee. This approach also introduced uncertainty in that the advisor paid for referrals even where many of the referrals did not lead to a successful engagement.

In contrast with these prior referral programs, the invention herein reduces the advisor's risk and better aligns the advisor's and the broker dealer's interests. Under the on-going fee sharing agreement, herein, the advisor pays where a referral results in the investor retaining the services of advisor. Further, because the referral fee is on-going for as long as the advisor retains the referred investor's business the referral fee can be a relatively small amount the advisor's management fee, instead of being front end loaded as with the prior referral programs. Thus, the referring broker dealer has significant financial incentive to provide services which support and foster a long term relationship between the referred investor and the advisor. Further using the system and method herein the referral fee is administered in a largely automated and cost effective manner.

The present embodiment also addresses the fact that for an effective program to be established some minimum level of commitment must be made by the advisors, and a consistent minimum revenue stream should be maintained. To achieve this end, the on-going referral fee sharing agreement provides that where an advisors referral fees fall below a specified minimum amount, then the specified minimum amount will be paid to the referring broker dealer, instead of, or in addition to, the referral fee sharing based on 15% of the advisor's asset management fees.

Figure 4:
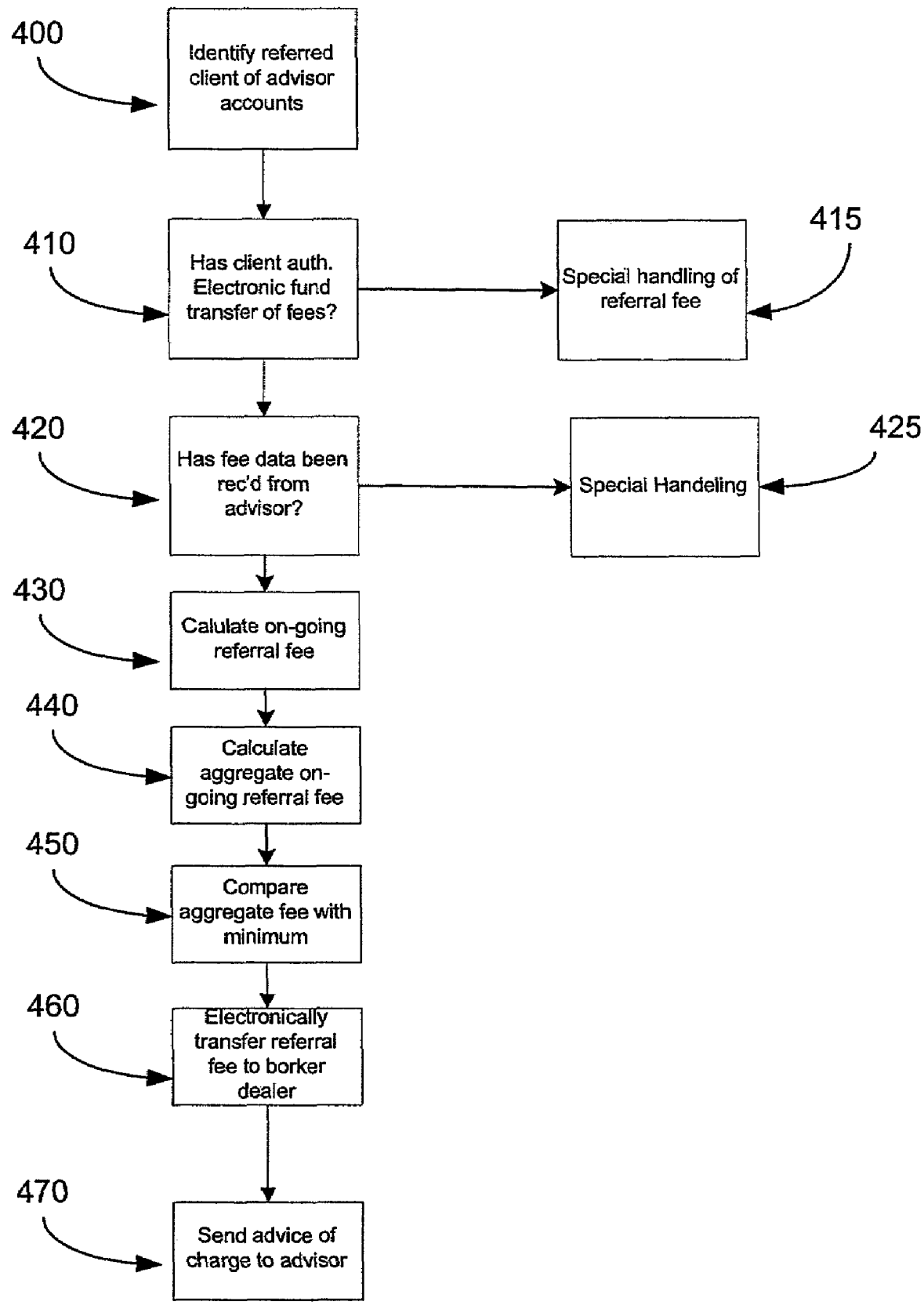
FIG. 4 is a flow chart illustrating a method of the present invention.
Figure 5:
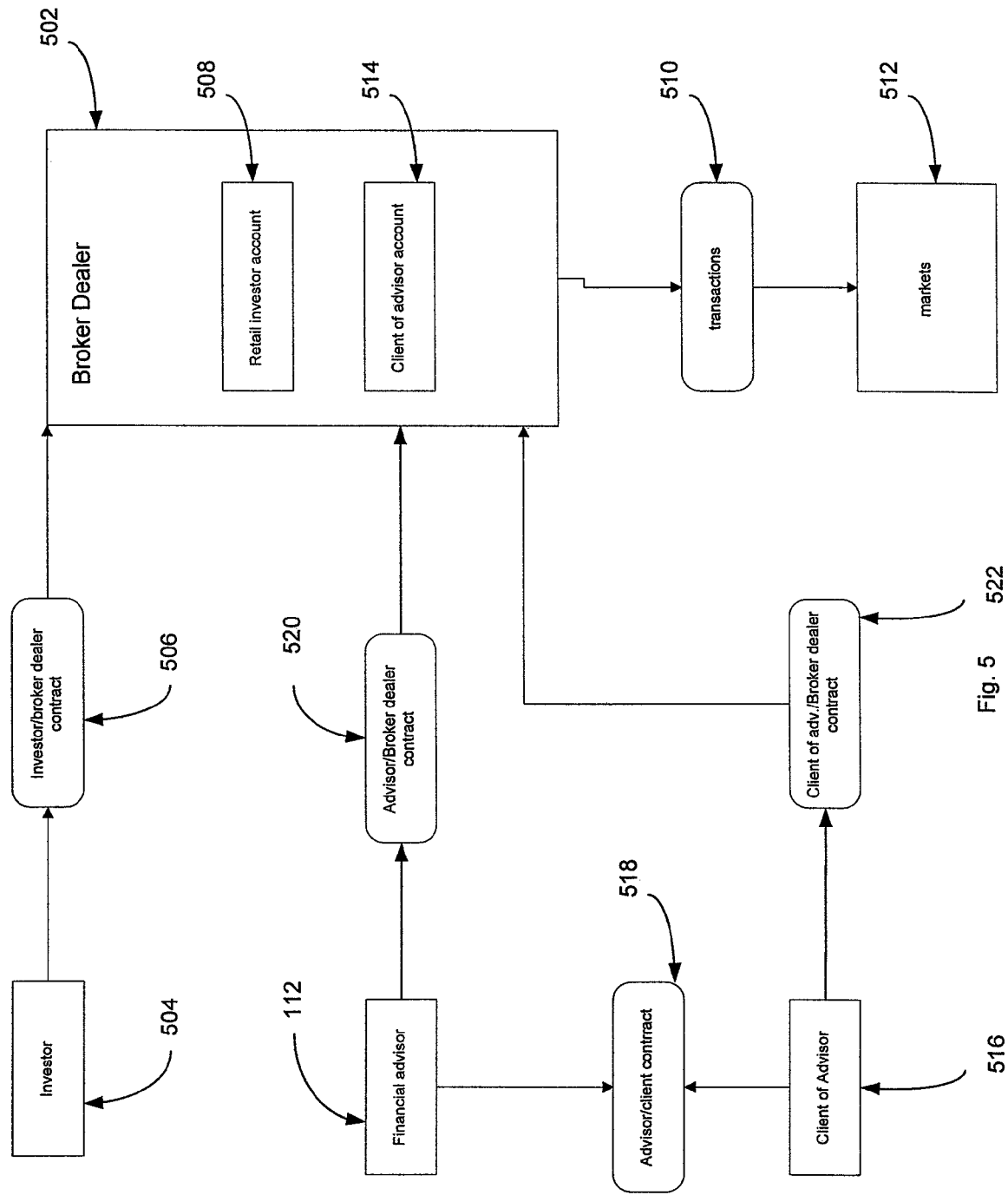
FIG. 5 is a diagram illustrating the relationships between an investor, a broker dealer, a financial advisor, and a client of the advisor.

FIG. 4 shows the process by which referral fees are automatically assessed for referred accounts and provides detail regarding the on-going fee sharing agreement. At step 400 the processor system 212 operates to analyze data in the database system 202, and to identify referred client of the advisor financial accounts. Once the referred financial accounts have been identified by the processor system 212, the processor system determines if the advisor customer has entered into an electronic funds transfer agreement, which allows for electronic transfer of funds out of the referred customers financial account to pay for advisor management fees 410. If the customer has authorized electronic transfer of funds then the automated method can proceed. If the customer has not authorized electronic transfer of funds then many of the steps below are still applicable for determining the amount of the on-going referral, but the referral fee would have to be processed on a special handling basis 415. Specifically, the referral fee for the account would have to be manually billed to the advisor, or electronically transferred from other fees which the advisor is due. In the normal course of operation, the broker dealer and the advisor will encourage advisor customers to authorize electronic transfer of funds to pay management fees, which reduces the cost of delivering services to the customers.

In the present invention the advisor can submit fees to be charged to the advisor customer financial accounts over the internet, or other network connection, to the comm port 214 of the broker dealer system 200. Additionally, the advisor could communicate directly employees of the broker dealer to convey this information. For accurate processing, accounting and tracking purposes, the data provided by the advisor for the fees can identify the fees separately for each account, and not aggregated which would create confusion as to how much each account should be charged. Further, in many cases the advisor will also provide additional services to the customer, such as financial planning, estate planning, or tax preparation. In one embodiment these additional fees are included as part of the asset management fee for purposes of determining the referral fee amount. In another embodiment these fees relating to additional services may not be considered as part of the asset management fee for purposes of determining the referral fee amount. One embodiment of the client advisor agreement provides that the asset management fees will be billed on a periodic (usually quarterly) basis. The on-going referral fee sharing agreement 216 can provide that within a fixed amount of time after the end of the quarter, the advisor will submit data indicating the amount of the asset management fee to be charged to each referred account.

At step 420 the processing system analyzes information provided by the advisor and determines if the asset management fee for a referred account has been submitted. If the asset management fee has been submitted, then the processing system will calculate 430 the referral fee (i.e. 15% of the asset management fee) for each referred account. If the advisor has not submitted that asset management fee for a given referred account within a set time period from the end of the quarter, then the processing system will use a special handling process 425 for determining a referral fee amount for the referred account. This special handling process can be a default method which provides that the processing system 212 will analyze the referred account data 208 in the database system 202 to determine the total asset value for the holdings in the given referred account. The processing system will then determine the value of 15 basis points (i.e. 0.15%) of the total asset value for the referred customer account. The amount determined by this default method will then be deducted from an amount of funds which are to be electronically transferred to the advisor for services provided in connection with servicing other customer accounts. If no fees are to be immediately electronically transferred to the advisor, then the amount of the referral fee calculated using the default method may be separately invoiced to the advisor, or it can be debited against fees to be electronically transferred to the advisor in the future.

Once all of the periodic (e.g. quarterly) referral fee amounts have been determined for each of the advisor's referred accounts, the processing systems 212 sums these referral amounts to determine 440 an aggregate referral amount which is owed to the referring broker dealer. The aggregate referral amount is then compared 450 against the specified minimum amount (discussed above). If the aggregate amount exceeds the specified minimum then advisor will be charged the aggregate referral amount. If the aggregate referral amount exceeds the specified amount then the advisor will be charged the referral amount calculated for each referred account. The calculated referral fees are electronically transferred 460 to the referring broker dealer.

One approach to transferring the referral fees to the broker dealer is to create a master account for the advisor and to transfer all fees due to the advisor from the customer accounts managed by the advisor, to an account holding funds for the advisor, from this fund the aggregate referral amount could be transferred to the broker dealer. Another approach is to electronically transfer the referral fee amount from the referred customer accounts at the end of each quarter, and to deduct the referral fee amounts from the fees which are to be transferred from the referred customer account advisor at the end of each quarter. In connection with the electronic transfer of a referral to the broker dealer, an advice of the charge is sent to the advisor 470. Another approach is to immediately transfer the referral fee to the broker dealer upon receipt of a notice of an asset management fee being due to a financial advisor on a particular referred client of an advisor account. At this point the asset management fee minus the referral fee could also be transferred to the financial advisor.

Although specific embodiments and methods of the present invention are shown and described herein, this invention is not to be limited by these methods and embodiments. Rather, the scope of the invention is to be defined by the following claims and their equivalents.

What is claimed is:

1. A computer system including financial account data which implements a program by which a referring party can, under an on-going referral fee sharing agreement, refer an investor to a financial advisor who provides asset management services, comprising:
    a database system configured to store financial account data, the financial account data identifying a referred financial account which is managed by the financial advisor, is custodied by the referring party, and which is subject to the on-going referral fee sharing agreement; and
    a processor system configured to process the financial account data, wherein the processor system is programmed to
        periodically analyze the financial account data in the database system,
        identify the referred financial account based on the financial account data analyzed, and
        periodically electronically transfer a referral fee from the referred financial account to the referring party, wherein the referral fee is based on a successful referral which results in the investor engaging the services of the financial advisor.

2. The computer system of claim 1 wherein the processor system is further programmed to
    determine an asset management fee charged to the referred financial account managed by the financial advisor, and
    determine the referral fee based on the asset management fee.

3. The computer system of claim 2 wherein the processor system is further programmed to determine the referral fee on a periodic basis.

4. The computer system of claim 3 wherein the referral fee is calculated by the processor system to be 15% of the asset management fee.

5. The computer system of claim 1 wherein the processor system is programmed to
- determine an asset value based on a plurality of assets held in the referred financial account, and
- determine the referral fee based on the determination of the asset value.

6. The computer system of claim 1 wherein the processor is further programmed to
- identify a plurality of referred financial accounts managed by the financial advisor and to periodically determine a referral fee for each of the plurality of referred financial accounts managed by the financial advisor, and to determine an aggregate referral fee for the plurality of referred financial accounts managed by the financial advisor, wherein the aggregate referral fee is equal to the sum of the referral fees for each of the plurality of referred financial accounts managed by the financial advisor.

7. The computer system of claim 6, wherein the processor is further programmed to compare the aggregate referral fee with a specified minimum amount, and determine when the aggregate referral fee is exceeded by the specified minimum amount.

8. The computer system of claim 6 wherein the plurality of referred financial accounts are associated with a plurality of investors.

9. The computer system of claim 1 wherein the processor system is further programmed to determine the referral fee on a quarterly basis.

10. The computer system of claim 1, wherein the referral fee is based on a fixed percentage of an advisors asset management fee.

11. The computer system of claim 1 further comprising a communication port for connecting to the internet.

* * * * *